United States Patent
Wu et al.

(10) Patent No.: US 8,252,420 B2
(45) Date of Patent: *Aug. 28, 2012

(54) POLYAMIDEIMIDE POLYBENZIMIDAZOLE CONTAINING INTERMEDIATE TRANSFER MEMBERS

(75) Inventors: Jin Wu, Pittsford, NY (US); Dante M. Pietrantoni, Rochester, NY (US); Yuhua Tong, Webster, NY (US); Jonathan H. Herko, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/008,201

(22) Filed: Jan. 18, 2011

(65) Prior Publication Data

US 2012/0183783 A1    Jul. 19, 2012

(51) Int. Cl.
*B32B 27/18* (2006.01)
*B32B 27/34* (2006.01)
*G03G 15/16* (2006.01)

(52) U.S. Cl. ............... 428/421; 428/422; 428/473.5; 399/308

(58) Field of Classification Search .................. None
See application file for complete search history.

(56) References Cited

U.S. PATENT DOCUMENTS

| | | | |
|---|---|---|---|
| 4,763,158 A * | 8/1988 | Schlueter, Jr. .............. 399/324 |
| 5,487,707 A | 1/1996 | Sharf et al. |
| 5,549,946 A * | 8/1996 | Iura et al. .................. 428/35.8 |
| 6,139,784 A | 10/2000 | Oshima et al. |
| 6,318,223 B1 | 11/2001 | Yu et al. |
| 6,397,034 B1 | 5/2002 | Tarnawskyj et al. |
| 6,440,515 B1 | 8/2002 | Thornton et al. |
| 6,602,156 B2 | 8/2003 | Schlueter, Jr. |
| 7,031,647 B2 | 4/2006 | Mishra et al. |
| 7,130,569 B2 | 10/2006 | Goodman et al. |
| 7,139,519 B2 | 11/2006 | Darcy, III et al. |
| 2005/0045856 A1 * | 3/2005 | Yoshikawa et al. ........... 252/500 |

* cited by examiner

*Primary Examiner* — Ramsey Zacharia
(74) *Attorney, Agent, or Firm* — Eugene O. Palazzo (57) ABSTRACT

An intermediate transfer member that includes a mixture of a polyamideimide, a polybenzimidazole, and an optional conductive filler.

18 Claims, 1 Drawing Sheet

POLYAMIDEIMIDE POLYBENZIMIDAZOLE CONTAINING INTERMEDIATE TRANSFER MEMBERS

This disclosure is generally directed to an intermediate transfer member that includes a polyamideimide, a polybenzimidazole, and a conductive component.

BACKGROUND

A number of intermediate transfer members, such as intermediate transfer belts selected for transferring a developed image in xerographic systems, are known. For example, there are known intermediate transfer belts that contain thermosetting polyimides. These imides can be costly especially because such imides are usually subjected to curing by heating for extended time periods. Also known are intermediate transfer members that include materials with characteristics that cause these members to become brittle resulting in inadequate acceptance of the developed image and subsequent partial transfer of developed xerographic images to a substrate like paper. Other disadvantages that may be associated with intermediate transfer members relate to maintaining a stable resistivity, and degradation in the developed image to be transferred from the member.

Intermediate transfer members that enable acceptable registration of the final color toner image in xerographic color systems using synchronous development of one or more component colors, and using one or more transfer stations are known. However, a disadvantage of using an intermediate transfer member, in color systems, is that a plurality of developed toner transfer operations is utilized thus sometimes causing charge exchange between the toner particles and the transfer member, which ultimately can result in less than complete toner transfer. This can result in low resolution images on the image receiving substrate like paper, and image deterioration. When the image is in color, the image can additionally suffer from color shifting and color deterioration.

There is a need for intermediate transfer members that substantially avoid or minimize the disadvantages of a number of known intermediate transfer members.

Also, there is a need for intermediate transfer member materials that have a high glass transition temperature, Tg, with minimal brittleness.

Further, there is a need for intermediate transfer members with components that can be economically and efficiently manufactured, and with reduced curing times.

There is also a need for intermediate transfer members that possess excellent transfer capabilities, and where the components of the members have minimal and acceptable brittleness characteristics.

Additionally, there is a need for intermediate transfer members that have excellent conductivity or resistivity, and that possess acceptable humidity insensitivity characteristics leading to developed images with minimal resolution issues.

Moreover, there is a need for intermediate transfer members with excellent wear and acceptable abrasion resistance.

These and other needs are achievable in embodiments with the intermediate transfer members and components thereof disclosed herein.

SUMMARY

Disclosed is an intermediate transfer member comprising a polymer layer comprising a polyamideimide and a polybenzimidazole.

There is illustrated herein an intermediate transfer member comprising a supporting substrate, and a polymer layer comprising a mixture of a polyamideimide and a polybenzimidazole, wherein the polyamideimide is selected from the group consisting of those represented by the following formulas/structures where n represents a number of repeating segments of from about 20 to about 1,000, and the polybenzimidazole is represented by the following formula/structure wherein n represents a number of repeating segments of from about 30 to about 500.

Also, disclosed is an intermediate transfer belt comprised of a polyimide supporting substrate and a polymer layer in contact with the supporting substrate comprising a mixture of a polyamideimide, a polybenzimidazole, and a conductive filler, and wherein the polyamideimide is selected from the group consisting of the following formulas/structures -continued wherein n represents a number of repeating segments, and the polybenzimidazole is represented by the following formula/structure wherein n is a number of from about 100 to about 500, and wherein the polyamideimide is present in an amount of from about 45 to about 75 weight percent, the polybenzimidazole is present in an amount of from about 25 to about 55 weight percent, and the conductive component is present in an amount of from about 5 to about 20 weight percent, and the total thereof of the polyamideimide, the polybenzimidazole, and the conductive component is about 100 weight percent, and which member has a resistivity of from about $10^8$ to about $10^{13}$ ohm/square.

BRIEF DESCRIPTION OF THE DRAWINGS

The following Figures are provided to further illustrate the intermediate transfer members disclosed herein.

EMBODIMENTS

There is provided herein an intermediate transfer member comprising an optional supporting substrate, and thereover a polymer layer comprising a mixture of a polyamideimide and a polybenzimidazole.

Figure 1:
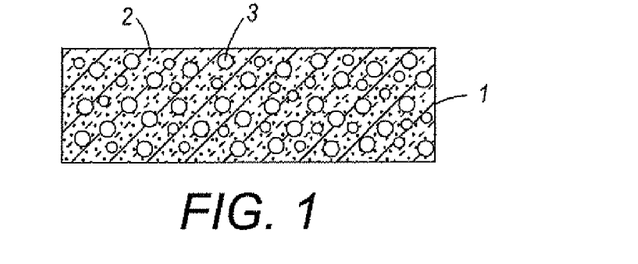
FIG. 1 illustrates an exemplary embodiment of a one-layer intermediate transfer member of the present disclosure.
Figure 2:
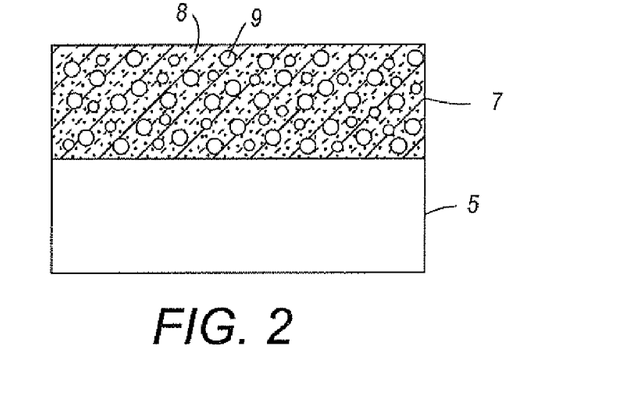
FIG. 2 illustrates an exemplary embodiment of a two-layer intermediate transfer member of the present disclosure.

In FIG. 1 there is illustrated a one-layer intermediate transfer member comprising a polymer layer 1 comprising a mixture 2 of a polyamideimide and a polybenzimidazole, and a conductive filler 3 dispersed therein.

in FIG. 2 there is illustrated a two-layer intermediate transfer member comprising a supporting substrate 5, a polymeric layer 7 comprising a mixture 8 of a polyamideimide and a polybenzimidazole, and a filler 9 dispersed therein.

Figure 3:
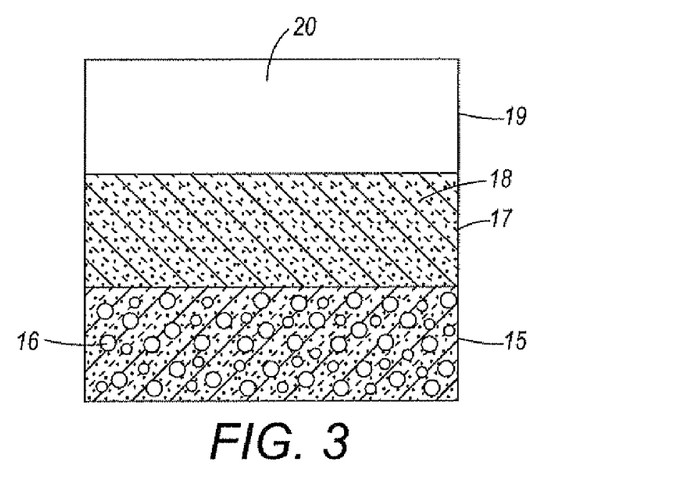
FIG. 3 illustrates an exemplary embodiment of a three-layer intermediate transfer member of the present disclosure.

In FIG. 3 there is illustrated a three-layer intermediate transfer member comprising a supporting substrate 15 comprising a filler 16 dispersed therein, a polymeric layer 17 comprising a mixture 18 of a polyamideimide and a polybenzimidazole, and a release layer 19 containing a release component 20.

There is disclosed an intermediate transfer member that generally comprises a polymer layer comprising a blend or mixture of a polyamideimide and a polybenzimidazole, and optionally a conductive component like carbon black. The mixture of polyamideimide and a polybenzimidazole provides an intermediate transfer member that exhibits properties similar to a conventional intermediate transfer member formed using polyimide, but at substantially reduced cost. The intermediate transfer member can be provided in any of a variety of configurations, such as a one-layer configuration, or in a multi-layer configuration including, for example, a supporting substrate and/or a release layer. The final intermediate transfer member may be in the form of an endless flexible belt, a web, a flexible drum or roller, a rigid roller or cylinder, a sheet, a drelt (a cross between a drum and a belt), and the like.

The intermediate transfer member comprising a mixture of polyamideimide and polybenzimidazole generally exhibits an excellent functional resistivity, a high Young's modulus of, for example, from about 3,000 to about 8,000 MPa or from about 4,500 to about 6,500 MPa, a high glass transition temperature ($T_g$) of from about 250° C. to about 400° C. or from about 320° C. to about 375° C., and a CTE (coefficient of thermal expansion) of from about 20 to about 70 ppmpK (parts per million per degree Kelvin), or from about 30 to about 50 ppmpK.

The single layered or multi-layered intermediate transfer members disclosed herein generally possess, in addition to reduced curing times of 1 to 2 hours for the components of the members, an excellent resistivity as measured with a known High Resistivity Meter of, for example, from about $10^8$ to about $10^{13}$ ohm/square, or from about $10^9$ to about $10^{12}$ ohm/square, or still from about $10^{10}$ to about $10^{11}$ ohm/square, and acceptable wear and abrasion resistance characteristics.

Polyamideimide

As the polyamideimide used in the intermediate transfer member, any suitable polyamideimide can be used. The polyamideimide used in embodiments can be a polyamideimide homopolymer, a polyamideimide copolymer, or a higher order polyamideimide polymer. Mixtures of two or more different polyamideimides can also be used. For example, the polyamideimide can be represented by the following formula/structure where n represents the number of repeating segments in the polymer chain and can be, for example, from about 20 to about 1,000; from about 75 to about 900; from about 100 to about 700; from about 200 to about 600; or from about 275 to about 500, or fractions thereof, and where Ar is an aryl group with, for example, from about 6 to about 42; from about 6 to about 36; from about 6 to about 30; from about 6 to about 24; from about 6 to about 18, or from about 6 to about 12 carbon atoms.

Examples of specific suitable polyamideimides include those represented by the following formulas/structures and wherein n represents the number of repeating segments as defined above.

The polyamideimides, which are commercially available from Toyobo Company, can be synthesized by at least the following two known methods: (1) the isocyanate method, which involves the reaction between an isocyanate and trimellitic anhydride; or (2) the acid chloride method, where there is reacted a diamine and trimellitic anhydride chloride. In the first method, (1), when more than one, such as two, three or four, isocyanate is selected to react with a trimellitic anhydride, a polyamideimide copolymer is formed. In the method (2), when more than one, such as two or three, acid chloride is selected to react with a trimellitic anhydride chloride, a polyamideimide copolymer is formed.

Commercially available or obtainable examples of the polyamideimides include VYLOMAX® HR-11NN (15 weight percent solution in N-methylpyrrolidone [NMP], $T_g=300°$ C., and $M_w=45,000$), HR-12N2 (30 weight percent [wt. percent] solution in N-methylpyrrolidone/xylene/methylethylketone=50/35/15 [wt. percent], $T_g=255°$ C., and $M_w=8,000$), HR-13NX (30 weight percent solution in N-methylpyrrolidone/xylene=67/33 [wt. percent], $T_g=280°$ C., and $M_w=10,000$), HR-15ET (25 weight percent solution in ethanol/toluene=50/50 [wt. percent], $T_g=260°$ C., and $M_w=10,000$), HR-16NN (14 weight percent solution in N-methylpyrrolidone, $T_g=320°$ C., and $M_w=100,000$), HR-66NN (13 weight percent solution in N-methylpyrrolidone, $T_g=340°$ C.), all commercially available from Toyobo Company of Japan, and TORLON® AI-10 ($T_g=272°$ C.), commercially available from Solvay Advanced Polymers, LLC, Alpharetta, Ga.

The number average molecular weight of the polyamideimide, in embodiments, can be, for example, from about 5,000 to about 50,000; from about 10,000 to about 35,000; or from about 15,000 to about 25,000; and the weight average molecular weight of the polyamideimide can be, for example, from about 10,000 to about 500,000; from about 50,000 to about 325,000; or from about 100,000 to about 300,000, where the weight average molecular weights and number average molecular weights are determined by known methods, such as GPC analysis.

Polybenzimidazoles

The intermediate transfer member also includes a polybenzimidazole that is blended or mixed with the polyamideimide. As the polybenzimidazole used in the intermediate transfer member, any suitable polybenzimidazole, or mixture of two, three, or more different polybenzimidazoles can be used.

Examples of suitable polybenzimidazoles that can be selected for the intermediate transfer member polymer mixture are represented by the following formula/structure where n is, for example, a number of from about 30 to about 625; from about 30 to about 500; from about 100 to about 400; or still from about 200 to about 300, or fractions thereof.

Commercially available polybenzimidazoles (PBI) are obtainable from Boedeker Plastics, Inc., Shiner, Tex. under the trade name of CELAZOLE®, and include, for example, a 26 weight percent PBI solution in N,N'-dimethylacetamide (DMAc).

The polybenzimidazoles can be prepared, for example, in accordance with the following reaction scheme where n is as defined above.

The number average molecular weight of the polybenzimidazole can be, for example, from about 2,000 to about 40,000; from about 5,000 to about 20,000; or from about 7,000 to about 15,000; and the weight average molecular weight of the polybenzimidazole can be, for example, from about 9,000 to about 150,000; from about 30,000 to about 120,000; or still from about 60,000 to about 90,000 with the weight and number average molecular weight being determined by known methods, such as GPC analysis. The glass transition temperature, $T_g$ of the PBI can be from about 390° C. to about 420° C., or from about 400° C. to about 410° C.

For the blended mixture of the polyamideimide and the polybenzimidazole, the polyamideimide can be present in an amount of from about 1 to about 99 weight percent; from about 25 to about 75 weight percent; from about 40 to about 60 weight percent; or still about 50 weight percent, and the polybenzimidazole can be present in an amount of from about 99 to about 1 weight percent; from about 75 to about 25 weight percent; from about 40 to about 60 weight percent; or still about 50 weight percent, based on a total weight of the polyamideimide and the polybenzimidazole.

Optional Polymer Binder

In embodiments of the present disclosure, the intermediate transfer member can further include an optional additional polymeric binder. This additional polymeric binder can be included in the polymer layer in addition to the polyamideimide and polybenzimidazole. Examples of suitable additional polymeric binders include a polyimide, a polycarbonate, a polyphenylene sulfide, a polyamide, a polysulfone, a polyetherimide, a polyester, a polyvinylidene fluoride, a polyethylene-co-polytetrafluoroethylene, mixtures thereof, and the like.

When an additional polymeric binder is included, it can be included in any desirable and effective amount. For example, an additional polymeric binder can be present in an amount of from about 1 to about 25 weight percent, such as from about 1 to about 15, or from about 1 to about 10 weight percent, based on a total weight of the polymer layer containing the polyamideimide, polybenzimidazole, and additional polymer.

Filler

Optionally, the intermediate transfer member may contain one or more fillers. For example, a conductive filler can be included to alter and adjust the conductivity of the intermediate transfer member. Where the intermediate transfer member is a one layer structure, the conductive filler can be included in the polymer layer along with and dispersed in the polyamideimide and the polybenzimidazole. However, where the intermediate transfer member is a multi-layer structure, the conductive filler can be included in one or more layers of the member, such as in the polymer layer along with and dispersed in the polyamideimide and the polybenzimidazole, and/or in a different layer such as in a supporting substrate layer.

Any suitable filler can be used to provide the desired results. For example, suitable fillers include carbon black, a metal oxide, a polyaniline, other known suitable fillers, and mixtures of fillers. When present, the filler can be present in an amount of from about 1 to about 60 weight percent; from about 3 to about 40 weight percent; from about 10 to about 30 percent; or still from about 5 to about 20 weight percent of the total weight of the layer in which it is included.

Examples of carbon black fillers that can be selected for the intermediate transfer member include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m²/g, DBP absorption=1.05 ml/g), BLACK PEARLS® 880 (B.E.T. surface area=240 m²/g, DBP absorption=1.06 ml/g), BLACK PEARLS® 800 (B.E.T. surface area=230 m²/g, DBP absorption=0.68 ml/g), BLACK PEARLS® L (B.E.T. surface area=138 m²/g, DBP absorption=0.61 ml/g), BLACK PEARLS® 570 (B.E.T. surface area=110 m²/g, DBP absorption=1.14 ml/g), BLACK PEARLS® 170 (B.E.T. surface area=35 m²/g, DBP absorption=1.22 ml/g), VULCAN® XC72 (B.E.T. surface area=254 m²/g, DBP absorption=1.76 ml/g), VULCAN® XC72R (fluffy form of VULCAN® XC72), VULCAN® XC605, VULCAN® XC305, REGAL® 660 (B.E.T. surface area=112 m²/g, DBP absorption=0.59 ml/g), REGAL® 400 (B.E.T. surface area=96 m²/g, DBP absorption=0.69 ml/g), REGAL® 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and MONARCH® 1000 (B.E.T. surface area=343 m²/g, DBP absorption=1.05 ml/g, primary particle diameter=16 nanometers); Channel carbon blacks available from Evonik-Degussa; Special Black 4 (B.E.T. surface area=180 m²/g, DBP absorption=1.8 ml/g, primary particle diameter=25 nanometers), Special Black 5 (B.E.T. surface area=240 m²/g, DBP absorption=1.41 ml/g, primary particle diameter=20 nanometers), Color Black FW1 (B.E.T. surface area=320 m²/g, DBP absorption=2.89 ml/g, primary particle diameter=13 nanometers), Color Black FW2 (B.E.T. surface area=460 m²/g, DBP absorption=4.82 ml/g, primary particle diameter=13 nanometers), and Color Black FW200 (B.E.T. surface area=460 m²/g, DBP absorption=4.6 ml/g, primary particle diameter=13 nanometers). Other known suitable carbon blacks not specifically disclosed herein may be selected as the conductive component for the intermediate transfer member disclosed herein.

Examples of the polyaniline fillers that can be selected for incorporation into the intermediate transfer members are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns; or from about 1.5 to about 1.9 microns.

Metal oxide fillers that can be selected for the disclosed intermediate transfer members include, for example, tin oxide, antimony doped tin oxide, indium oxide, indium tin oxide, zinc oxide, and titanium oxide, and the like.

Intermediate Transfer Member Formation

The polymer components and optional filler can be formulated into an intermediate transfer member by any suitable method. For example, with known milling processes, uniform dispersions of the intermediate transfer member mixture can be obtained, and then coated on individual metal substrates, such as a stainless steel substrate, glass plates, or the like, using a known draw bar coating method. The resulting individual film or films can be dried at high temperatures, such as by heating of from about 100° C. to about 400° C., or from about 160° C. to about 300° C., for a suitable period of time, such as from about 20 to about 180 minutes, or from about 40 to about 120 minutes, while remaining on the substrates. After drying and cooling to room temperature, about 23° C. to about 25° C., the films resulting can be removed from the substrates by known processes, such as by hand peeling. The resultant films can have a thickness of, for example, from about 15 to about 150 microns; from about 20 to about 100 microns; or from about 25 to about 75 microns.

As metal substrates selected for the deposition of the polymer mixture and filler or fillers disclosed herein, there can be selected stainless steel, aluminum, nickel, copper, and their alloys, or other conventional materials. Other suitable substrates that can be used include glass plates, and the like.

Examples of solvents selected for formation of the polymers and filler component mixture, which solvents can be selected in an amount, for example, of from about 60 to about 95 weight percent, or from about 70 to about 90 weight percent of the total coating dispersion for the polymer layer mixture include, for example, alkylene halides such as methylene chloride, tetrahydrofuran, toluene, monochlorobenzene, N-methyl-2-pyrrolidone, N,N-dimethylformamide, N,N-dimethylacetamide, methyl ethyl ketone, methyl isobutyl ketone, mixtures thereof, and the like.

Supporting Substrate

If desired, a supporting substrate can be included in the intermediate transfer member, such as beneath the polymer layer containing the polyamideimide and polybenzimidazole blend. The supporting substrate can be included, for example, to provide increased rigidity or strength to the intermediate transfer member. When a supporting substrate is used, the metal or glass substrate described above as being used in forming the member can be replaced by the supporting substrate material, or the supporting substrate can first be formed on the metal or glass substrate followed by forming the polymer layer on the supporting substrate and prior to removing the completed structure from the metal or glass substrate.

In this embodiment, the coating dispersion of the polymer layer can be coated on any suitable supporting substrate material to form a dual layer intermediate transfer member. Exemplary supporting substrate materials include polyimide, polyamideimide, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15 [wt. percent], $T_g$=255° C., and $M_w$=8,000), HR-13NX (30 weight percent solution in N-methylpyrrolidone/xylene=67/33 [wt. percent], $T_g$=280° C., and $M_w$=10,000), HR-15ET (25 weight percent solution in ethanol/toluene=50/50 [wt. percent], $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Examples of specific polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, or from about 75 to about 125 microns.

Optional Release Layer

In embodiments, the intermediate transfer member may further include an outer release layer, usually present on top of the polymer layer. The release layer can be included, for example, to alter the surface characteristics of the intermediate transfer member to allow easier release of toner material from the intermediate transfer member. As such, the release layer can be used in embodiments with a supporting substrate on the opposite side of the polymer layer, or in embodiments that do not utilize a supporting substrate.

Exemplary materials that are suitable for use in a release layer include TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

The release layer may be deposited on the polymer layer by any known coating processes. Known methods for forming the outer release layer include dipping, spraying, such as by multiple spray applications of very thin films, casting, flow-coating, web-coating, roll-coating, extrusion, molding, or the like.

The disclosed intermediate transfer members are, in embodiments, weldable. That is, opposite ends of the formed film can be welded together, such as by ultrasonic welding, to produce a seam. The surface resistivity of the disclosed intermediate transfer member is, for example, from about $10^9$ to about $10^{13}$ ohm/square, or from about $10^{10}$ to about $10^{12}$ ohm/square. The sheet resistivity of the intermediate transfer weldable member is, for example, from about $10^9$ to about $10^{13}$ ohm/square, or from about $10^{10}$ to about $10^{12}$ ohm/square.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids unless otherwise indicated.

Example I 8.6 Weight percent of the polyamideimide (PAI), VYLOMAX® HR-11NN (a 15 weight percent solution in N-methylpyrrolidone, $T_g$=300° C., and with a weight average molecular weight, $M_w$=45,000) as obtained from the Toyobo Company of Japan, and 8.6 weight percent of the polybenzimidazole (PBI) Celazole® (26 weight percent solution in N,N'-dimethylacetamide, $T_g$=399° C., and with a weight average molecular weight, $M_w$=30,000) as obtained from Boedeker Plastics, Inc., Shiner, Tex. were mixed with 2.8 weight percent of carbon black 4 (B.E.T. surface area=180 $m^2/g$, DBP absorption=1.8 ml/g, primary particle diameter=25 nanometers) as obtained from DeGussa Chemicals, and 80 weight percent of N-methylpyrrolidone, followed by ball milling with 2 millimeter stainless shot in an Attritor for a period of 1 hour.

The above resulting dispersion was then coated on a stainless steel substrate of a thickness of 0.5 millimeter using a known draw bar coating method, and subsequently dried at 125° C. for 20 minutes, and then dried at 190° C. for an additional 40 minutes while remaining on the steel substrate.

The obtained dried coating was removed by hand peeling from the stainless steel substrate, and an about 100 micron thick intermediate transfer member film resulted where the weight ratio of the PAI/PBI/carbon black was 43/43/14 [wt. percent] based on the above initial mixture feed amounts.

Example II 8.6 Weight percent of the polyamideimide, VYLOMAX® HR-66NN (13 weight percent solution in N-methylpyrrolidone, $T_g$=340° C., and with a weight average molecular weight, $M_w$=100,000) as obtained from the Toyobo Company, and 8.6 weight percent of the PBI, Celazole® (26 weight percent solution in N,N'-dimethylacetamide, $T_g$= 399° C., and with a weight average molecular weight, $M_w$=30,000) as obtained from Boedeker Plastics, Inc., Shiner, Tex. are mixed with 2.8 weight percent of carbon black 4 (B.E.T. surface area=180 $m^2/g$, DBP absorption=1.8 ml/g, primary particle diameter=25 nanometers) as obtained from DeGussa Chemicals, and 80 weight percent of N-methylpyrrolidone, followed by ball milling with 2 millimeter stainless shot in an Attritor for a period of 1 hour.

The above resulting dispersion is then coated on a stainless steel substrate of a thickness of 0.5 millimeter using a known draw bar coating method, and subsequently dried at 125° C. for 20 minutes, and then dried at 290° C. for an additional 40 minutes while remaining on the steel substrate.

The obtained dried coating is then removed by hand peeling from the stainless steel substrate, and an about 100 micron thick intermediate transfer member film results where the weight ratio of the PAI/PBI/carbon black is 43/43/14 [wt. percent] based on the above initial mixture feed amounts.

Comparative Example 1

8.6 Weight percent of the polyamic acid (polyimide precursor), PYRE-ML RC5083 (about 18 to 19 weight percent in NMP/DMAc=15/85 [wt. percent]) as obtained from Industrial Summit technology Corp., Parlin, N.J., was mixed with 14 weight percent of the carbon black 4 (B.E.T. surface area=180 m²/g, DBP absorption=1.8 ml/g, primary particle diameter=25 nanometers) as obtained from Evonik-Degussa, and an appropriate amount of the solvent, NMP, to adjust the total solid content to about 17 weight percent, followed by ball milling the resulting mixture with 2 millimeter stainless shot with an Attritor for 1 hour.

The resulting dispersion was then coated on a stainless steel substrate of a thickness of 0.5 millimeter using the known draw bar coating method and subsequently dried at 125° C. for 20 minutes, at 190° C. for 40 minutes and at 320° C. for 60 minutes while remaining on the steel.

The obtained dried coating was removed by hand peeling from the stainless steel substrate, and an about 100 micron thick intermediate transfer member film resulted where the weight ratio of the polyimide/carbon black was 86/14 [wt. percent] based on the above initial mixture amounts.

Surface Resistivity Measurement

The above intermediate transfer members of Example I and Comparative Example 1 were measured for surface resistivity (averaging four to six measurements at varying locations of the members, 72° F./50 percent relative humidity) using a High Resistivity Meter (Hiresta-Up MCP-HT450 available from Mitsubishi Chemical Corp.). The results are provided in Table 1.

TABLE 1

| | Surface Resistivity (ohm/square) | Young's Modulus (MPa) |
|---|---|---|
| Example I, PAI/PBI/Carbon Black = 43/43/14 ITB | $3.4 \times 10^{10}$ | 5,000 |
| Comparative Example 1, Polyimide/Carbon Black = 86/14 ITB | $4.1 \times 10^{10}$ | 3,600 |

Both the Comparative Example 1 and Example I ITB devices were functional with a surface resistivity within the range of from about $10^9$ to about $10^{13}$ ohm/square.

Young's Modulus Measurement

The above intermediate transfer members of Comparative Example 1 and Example I were measured for Young's modulus following the known ASTM D882-97 process. A sample of Comparative Example 1 or Example I (0.5 inch×12 inch) was placed in the measurement apparatus, the Instron Tensile Tester, and then elongated at a constant pull rate until breaking. During this time, there was recorded the resulting load versus the sample elongation. The modulus was calculated by taking any point tangential to the initial linear portion of this curve and dividing the tensile stress by the corresponding strain. The tensile stress was calculated by the load divided by the average cross sectional area of each of the test samples. The results are also provided in Table 1.

The Young's modulus of the Example I intermediate transfer member was measured to be about 5,000 MPa (Mega Pascal), while that of the Comparative Example 1 intermediate transfer member was about 3,600 MPa. The disclosed PAI/PBI ITB of Example I possessed a higher Young's modulus than the commonly used polyimide ITB of Comparative Example 1.

Also, the preparation of the intermediate transfer member of Example I was accomplished at lower cost, about 50 percent less costs, due primarily to its shorter drying time (1 hour for Example I versus 2 hours for Comparative Example 1), and lower drying temperature (190° C. for Example I versus 320° C. for Comparative Example 1).

The above prepared intermediate transfer members of Examples I and II may be deposited on a supporting substrate, such as a polyimide, as illustrated herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprising a polymer layer comprising a mixture of a polyamideimide and a polybenzimidazole, wherein said intermediate transfer member is configured to accept a xerographic developed toner image from a photoconductor and subsequently transfer the image to a document, and wherein said polyamideimide is represented by the following formulas/structures where n represents a number of repeating segments, and Ar is an aryl group and wherein said member has a Young's modulus of from about 3,000 to about 8,000 MPa and a coefficient of thermal expansion of from about 20 to about 70 ppmpK.

2. An intermediate transfer member in accordance with claim 1 further comprising a supporting substrate, and wherein said polymer layer further includes a conductive filler component.

3. An intermediate transfer member in accordance with claim 1 wherein said polymer layer further comprises a conductive filler.

4. An intermediate transfer member in accordance with claim 1 wherein said polyamideimide is selected from the group consisting of those represented by one of the following formulas/structures -continued and 5. An intermediate transfer member in accordance with claim 4 wherein n is a number of from about 100 to about 500.

6. An intermediate transfer member in accordance with claim 3 wherein said polyamideimide is present in an amount of from about 1 to about 95 weight percent, said polybenzimidazole is present in an amount of from about 1 to about 95 weight percent, and said conductive filler is present in an amount of from about 4 to about 30 weight percent, and the total of said polyamideimide, said polybenzimidazole, and said conductive component is about 100 weight percent.

7. An intermediate transfer member in accordance with claim 3 wherein said polyamideimide is present in an amount of from about 2 to about 80 weight percent, said polybenzimidazole is present in an amount of from about 2 to about 80 weight percent, and said conductive filler is present in an amount of from about 8 to about 20 weight percent, and the total thereof is about 100 weight percent.

8. An intermediate transfer member in accordance with claim 3 wherein said polyamideimide is present in an amount of from about 10 to about 70 weight percent, said polybenzimidazole is present in an amount of from about 10 to about 70 weight percent, and said conductive filler is present in an amount of from about 10 to about 18 weight percent, and the total thereof of said polyamideimide, said polybenzimidazole, and said conductive filler is about 100 weight percent.

9. An intermediate transfer member in accordance with claim 1 wherein said polyamideimide has a number average molecular weight of from about 5,000 to about 50,000 and has a weight average molecular weight of from about 10,000 to about 200,000, said polybenzimidazole has a number average molecular weight of from about 3,000 to about 40,000 and has a weight average molecular weight of from about 9,000 to about 150,000, and said member has a resistivity of from about $10^8$ to about $10^{13}$ ohm/square.

10. An intermediate transfer member in accordance with claim 1 wherein said polyamideimide has a number average molecular weight of from about 10,000 to about 25,000 and has a weight average molecular weight of from about 50,000 to about 150,000, and said polybenzimidazole has a number average molecular weight of from about 9,000 to about 15,000 and a weight average molecular weight of from about 20,000 to about 120,000.

11. An intermediate transfer member in accordance with claim 1 further comprising an outer release layer positioned on said polymer layer in the configuration of a layer, wherein said release layer is selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof.

12. An intermediate transfer member in accordance with claim 1 wherein said polyamideimide is represented by the following formula/structure wherein n is a number of from about 100 to about 500, and said polybenzimidazole is represented by the following formula/structure wherein n is a number of from about 200 about 700.

13. An intermediate transfer member in accordance with claim 1 wherein said polybenzimidazole is represented by the following formula/structure wherein n represents a number of repeating segments.

14. An intermediate transfer member in accordance with claim 13 wherein n is a number or fraction thereof of from about 30 to about 500.

15. An intermediate transfer member in accordance with claim 13 wherein n is a number of from about 100 to about 300.

16. An intermediate transfer member consisting of a supporting substrate, and a polymer layer consisting of a mixture of a conductive filler, a polyamideimide and a polybenzimidazole, wherein said polyamideimide is selected from the group consisting of those represented by the following formulas/structures and where n represents a number of repeating segments of from about 20 to about 1000, and said polybenzimidazole is represented by the following formula/structure wherein n represents a number of repeating segments of from about 30 to about 500, and wherein said intermediate transfer member is configured to accept a xerographic developed toner image from a photoconductor and subsequently transfer the image to a document, and wherein said member has a Young's modulus of from about 3,000 to about 8,000 MPa and a coefficient of thermal expansion of from about 20 to about 70 ppmpK.

17. An intermediate transfer member in accordance with claim 16 wherein n of the polybenzimidazole is from about 100 to about 400, and n of said polyamideimide is from about 50 to about 500; and said member exhibits a modulus of from about 4,500 to about 6,500 MPa, and said polybenzimidazole has a glass transition temperature of from about 320° C. to about 375° C.

18. An intermediate transfer belt consisting of a polyimide supporting substrate and a polymer layer in contact with said supporting substrate, said polymer layer consisting of a mixture of a polyamideimide, a polybenzimidazole, and a conductive filler, and wherein said polyamideimide is selected from the group consisting of the following formulas/structures and wherein n represents a number of repeating segments, and said polybenzimidazole is represented by the following formula/structure wherein n is a number of from about 100 to about 500, and wherein said polyamideimide is present in an amount of from about 45 to about 75 weight percent, said polybenzimidazole is present in an amount of from about 25 to about 55 weight percent, and said conductive component is present in an amount of from about 5 to about 20 weight percent, and the total thereof of said polyamideimide, said polybenzimidazole, and said conductive filler is about 100 weight percent, and which member has a resistivity of from about $10^8$ to about $10^{13}$ ohm/square, and wherein said intermediate transfer member is configured to accept a xerographic developed toner image from a photoconductor and subsequently transfer the image to a document, and wherein said member has a Young's modulus of from about 3,000 to about 8,000 MPa and a coefficient of thermal expansion of from about 20 to about 70 ppmpK.

* * * * *